United States Patent
Vemulakonda et al.

(10) Patent No.: US 10,608,984 B2
(45) Date of Patent: Mar. 31, 2020

(54) METHOD AND DEVICE FOR PROVISIONING A NEW NODE USING IP UNNUMBERED INTERFACES

(71) Applicant: Cisco Technology, Inc., San Jose, CA (US)

(72) Inventors: Srividya Vemulakonda, San Jose, CA (US); Huilong Huang, Milpitas, CA (US); Shyam Kapadia, San Jose, CA (US); Rajesh B Nataraja, Sunnyvale, CA (US); Liqin Dong, San Jose, CA (US); Stephanie Wong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 15/465,496

(22) Filed: Mar. 21, 2017

(65) Prior Publication Data

US 2018/0183753 A1    Jun. 28, 2018

Related U.S. Application Data (60) Provisional application No. 62/439,541, filed on Dec. 28, 2016.

(51) Int. Cl.
*H04L 29/12* (2006.01)
*H04L 12/24* (2006.01)

(52) U.S. Cl.
CPC ...... *H04L 61/2015* (2013.01); *H04L 41/0809* (2013.01); *H04L 41/0886* (2013.01);
(Continued)

(58) Field of Classification Search
None
See application file for complete search history.

(56) References Cited

U.S. PATENT DOCUMENTS

| 7,111,055 B2 | 9/2006 | Falkner |
| 9,130,836 B2 | 9/2015 | Kapadia et al. |

(Continued)

FOREIGN PATENT DOCUMENTS

| EP | 1076848 B1 | 7/2002 |
| EP | 2043320 A1 | 1/2009 |

OTHER PUBLICATIONS

Cisco, "Nexus 5000 Series NX-OS Fundamentals Configuration Guide", Release 5.1(3)N2(1), Feb. 24, 2016, pp. 1-8.
(Continued)

*Primary Examiner* — Younes Naji
(74) *Attorney, Agent, or Firm* — Merchant & Gould P.C.

(57) ABSTRACT

In one implementation, a method performed by a first node with interfaces configured as IP unnumbered interfaces sharing a single IP address and to communicate with a DHCP-associated second node includes: obtaining a first message that indicates a configuration status of a third node at a respective interface; obtaining a second message for the third node from the DHCP-associated second node that includes a temporary IP address for the third node and an indicator of a file server; obtaining a third message associated with the third node that includes the temporary IP address, the third message requests address information for the file server; and configuring the third node by establishing a connection between the third node and the file server to transfer at least one configuration file, where configuring the third node includes providing the temporary IP address to the DHCP-associated second node via BGP.

20 Claims, 10 Drawing Sheets

(52) U.S. Cl.
    CPC ........ *H04L 61/103* (2013.01); *H04L 41/0853* (2013.01); *H04L 41/0876* (2013.01); *H04L 61/6022* (2013.01)

(56) References Cited

U.S. PATENT DOCUMENTS

| | | |
|---|---|---|
| 9,286,047 B1 | 3/2016 | Avramov et al. |
| 9,344,333 B2 * | 5/2016 | Dibirdi ............... H04L 41/0806 |
| 2003/0126242 A1 | 7/2003 | Chang |
| 2003/0177208 A1 * | 9/2003 | Harvey, IV ............. G06F 8/654 709/221 |
| 2006/0133405 A1 * | 6/2006 | Fee .................... H04L 12/2856 370/437 |
| 2007/0162420 A1 | 7/2007 | Ou et al. |
| 2009/0210523 A1 * | 8/2009 | Duggan .................. H04L 41/12 709/223 |
| 2010/0042707 A1 * | 2/2010 | Zhao .................. H04L 61/2015 709/221 |
| 2011/0158088 A1 | 6/2011 | Lofstrand et al. |
| 2013/0201979 A1 * | 8/2013 | Iyer ...................... H04W 84/12 370/338 |
| 2015/0188814 A1 * | 7/2015 | Jain ........................ H04L 45/74 370/392 |
| 2017/0163597 A1 * | 6/2017 | Amerneni ........... H04L 61/2061 |
| 2017/0195220 A1 * | 7/2017 | Sivaraj .................... H04L 45/66 |

OTHER PUBLICATIONS

Cisco, "Understanding and Configuring the IP Unnumbered Command", Nov. 2, 2016, pp. 1-8.
Cisco, Buresh et al., "A Modern, Open and Scalable Fabric VXLAN EVPN", pp. 1-36, 149-170.

* cited by examiner

METHOD AND DEVICE FOR PROVISIONING A NEW NODE USING IP UNNUMBERED INTERFACES

TECHNICAL FIELD

The present disclosure generally relates to networking, and in particular, to systems, methods, and devices for provisioning nodes in a network.

BACKGROUND

Power-on auto-provisioning (POAP) is a feature by which a new switch automatically configures itself on boot-up without manual intervention from a network administrator (sometimes also referred to as "touchless day-0 device bring-up"). However, this assumes that a DHCP (dynamic host configuration protocol) server and an FTP (transfer protocol) or TFTP (trivial file transfer protocol) server are reachable by the new switch that is coming up.

In a VXLAN-EVPN (virtual extensible local area network/Ethernet virtual private network) based programmable fabric deployment, it is important that day-0 bring-up of nodes (e.g., either leaf or spine nodes) is handled in an automated way. While traditional provisioning via a mgmt0 interface (e.g., out-of-band) also works, many consumers prefer in-band POAP.

In a VXLAN-EVPN based programmable fabric deployment, to simplify Internet protocol (IP) address management on the underlay, the use of IP unnumbered interfaces is preferred where only one unique IP address per device is used to bring-up the routing table state between the various devices. All the core facing interfaces (e.g., fabric ports) on a device share this per device unique IP.

While the usage of IP unnumbered interfaces simplifies IP address management on the underlay, this complicates how DHCP relay functionality would work on the in-band interfaces since there is no longer a regular layer-3 interface under which a relay can be readily configured. And, without the DHCP relay functionality, in-band POAP does not operate properly.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for POAP (power-on auto-provisioning) a new node using Internet protocol (IP) unnumbered interfaces in a virtual extensible local area network/Ethernet virtual private network (VXLAN/EVPN) topology. According to some implementations, a method is performed at a first node with one or more processors, non-transitory memory, and a plurality of interfaces configured as IP unnumbered interfaces sharing a single IP address and to communicate with a dynamic host configuration protocol (DHCP)-associated second node. For example, in some implementations, the method includes: obtaining a first message that indicates a configuration status of a third node at a respective interface of the plurality of interfaces; obtaining a second message for the third node from the DHCP-associated second node, where the second message includes a temporary IP address for the third node and an indicator of a file server; obtaining a third message associated with the third node that includes the temporary IP address, where the third message requests address information for the file server; and configuring the third node by establishing a connection between the third node and the file server to transfer at least one configuration file, where configuring the third node includes providing the temporary IP address to the DHCP-associated second node via a border gateway protocol (BGP).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes:

one or more processors, a non-transitory memory, and means for performing or causing performance of any of the methods described herein.

Example Embodiments

In a current VXLAN-EVPN based programmable fabric deployment, day-0 bring-up of switches via POAP works over management ports. Day-0 bring-up of switches via POAP over in-band interfaces also works when the core interfaces are configured as layer-3 IP numbered interfaces. In such a deployment, the DHCP server is configured with unique subnet scopes for layer-3 core-facing interface pairs and "IP DHCP Relay" is enabled under core facing interfaces (e.g., fabric port). The DHCP server can then be connected to any leaf via VRF (virtual routing and forwarding).

With the use of IP unnumbered interfaces in the VXLAN-EVPN based programmable fabric deployment, POAP over in-band interfaces does not operate the same as when IP numbered interfaces are used. In such a deployment with IP unnumbered interfaces, each device is assigned a unique/32 IP address that is shared between all the core facing interfaces on the device.

As one example, a new leaf node is trying to join an existing VXLAN-EVPN based programmable fabric deployment via one or more existing spine nodes. When the POAP process is triggered on the new leaf node, the new leaf node starts the DHCP process by sending out DHCP discover messages on its core facing interfaces (e.g., fabric ports). With the current implementation, even if a DHCP relay is configured on the spine node, the new leaf will neither be able to send/receive DHCP messages (e.g., to obtain an IP address from DHCP server) nor be able to send/receive FTP traffic (e.g., to download configurations and/or software images from the FTP server) without manual routes on the spine and leaf nodes in the path from the DHCP and FTP server to the new leaf node. According to some implementations, the proposed solution avoids manual routes in the VXLAN-EVPN based programmable fabric deployment, configures DHCP relay on core facing interfaces, enables proxy-ARP on core facing interfaces, and redistributes the routes via BGP.

Figure 1:
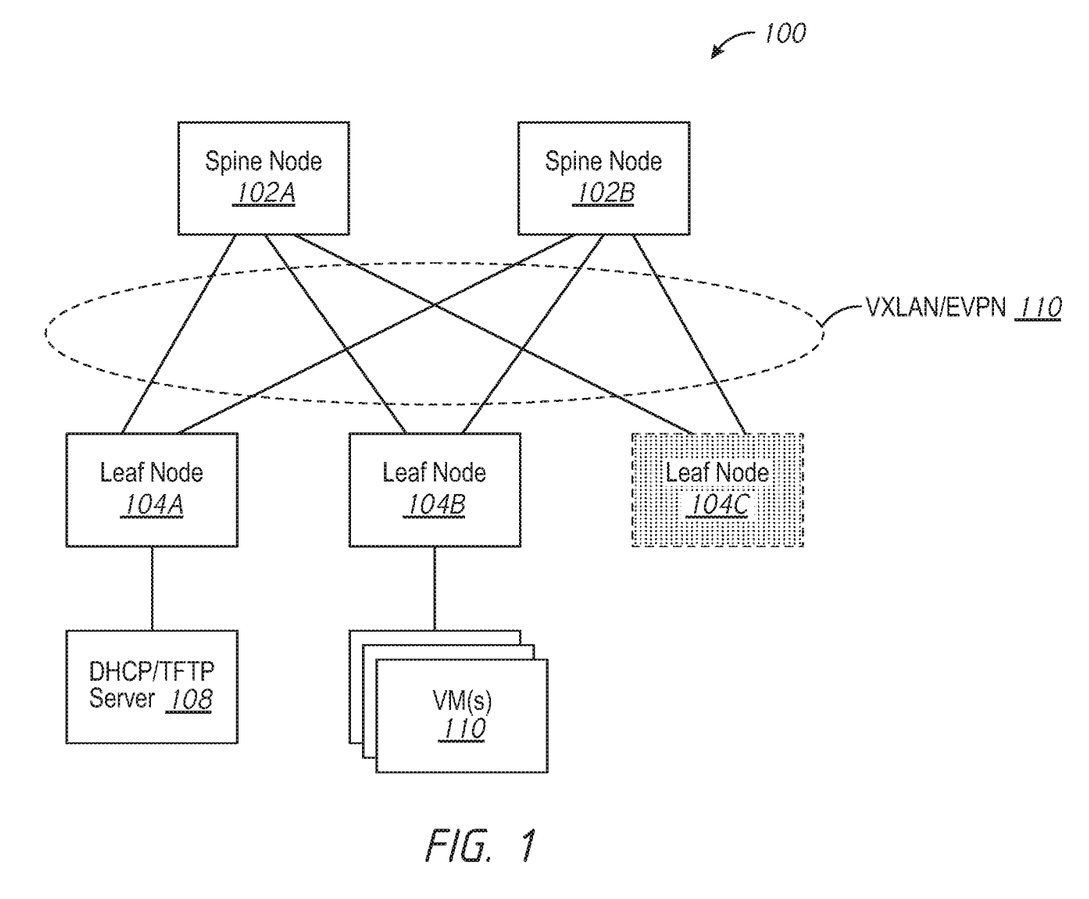
FIG. 1 is a block diagram of an example network environment in accordance with some implementations.

FIG. 1 is a block diagram of an example network environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the network environment 100 includes spine nodes 102A and 102B (sometimes collectively referred to herein as the "spine nodes 102"), and leaf nodes 104A, 104B, and 104C (sometimes collectively referred to herein as the "leaf nodes 104"). As will be appreciated by one of ordinary skill in the art, the network environment 100 shown in FIG. 1 includes an arbitrary number of spine nodes 102 and leaf nodes 104. As such, in other implementations, the network environment 100 includes a different number of spine nodes 102 and leaf nodes 104.

According to some implementations, each of the spine nodes 102 corresponds to a router, managed switch, unmanaged switch, hub, bridge, access point, virtual machine, or a suitable combination thereof. According to some implementations, each of the leaf nodes 104 corresponds to a router, managed switch, unmanaged switch, hub, bridge, access point, virtual machine, or a suitable combination thereof. In some implementations, the spine nodes 102 and the leaf nodes 104 are similar devices (e.g., switches), but the spine nodes 102 may have more throughput than the leaf nodes 104.

According to some implementations, the network environment 100 shown in FIG. 1 is representative of a spine-leaf architecture where each of the spine nodes 102 is communicatively coupled (e.g., via a wired connection) to each of the leaf nodes 104. As shown in FIG. 1, in some implementations, the network environment 100 operates according to a VXLAN/EVPN topology/fabric 110 where core facing interfaces (e.g., fabric ports) between the spine and leaf nodes are configured as IP unnumbered interfaces. As such, each of the spine nodes 102 and the leaf nodes 104 is associated with one unique IP address whereby core facing interfaces that participate in the IGP (interior gateway protocol) (e.g., via the IS-IS (intermediate-system-to-intermediate-system) or the OSPF (open shortest path first) routing protocols) share the unique IP address. According to some implementations, the loopback interface of each of the spine nodes 102 and the leaf nodes 104 is used for the BGP.

As shown in FIG. 1, each of the leaf nodes 104 may provide a service, application, program, and/or process to one or more end users. As one example, the leaf node 104A provides (e.g., operates or hosts) a DHCP/TFTP server 108. As another example, the leaf node 104B provides (e.g., operates or hosts) one or more virtual machines 110.

FIGS. 2A-2J illustrate block diagrams of an example POAP process within the network environment 100 in accordance with various implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, at least the spine node 102A and the leaf node 104A are assumed to be up and running according to the VXLAN/EVPN topology with their core facing interfaces (e.g., fabric ports) configured as IP unnumbered interfaces.

Figure 2A:
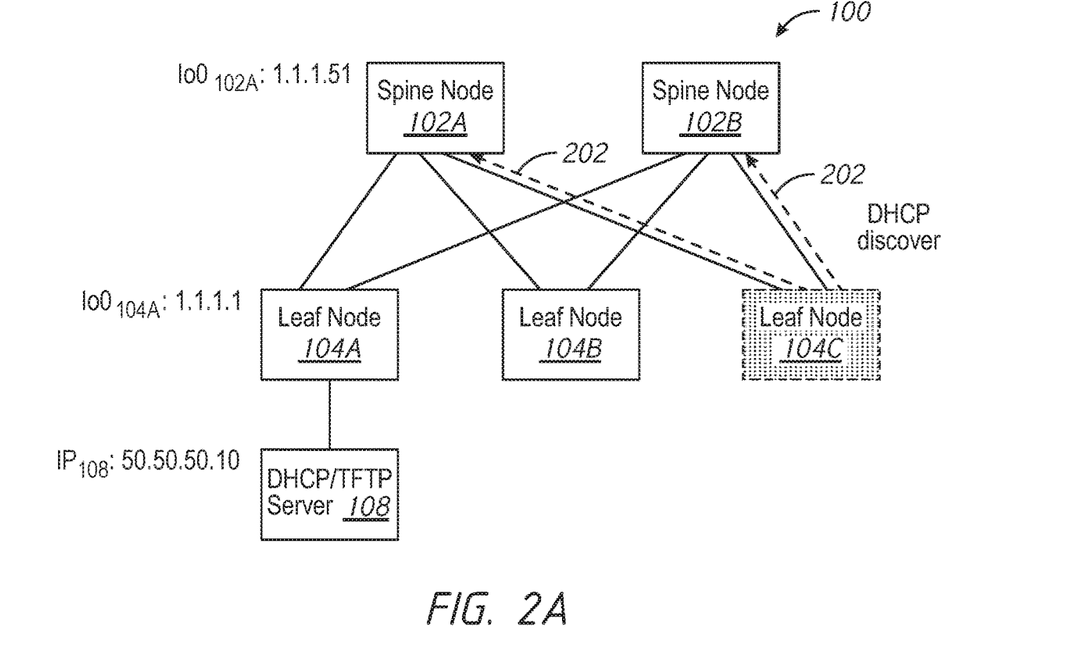
FIGS. 2A-2J illustrate block diagrams of an example POAP (power-on auto-provisioning) process within the network environment of FIG. 1 in accordance with various implementations.

As shown in FIG. 2A, the spine node 102A has its core facing interfaces (e.g., fabric ports) configured as IP unnumbered loopback0 (lo0) with IP proxy-ARP, where the IP address of loopback$0_{102A}$ is 1.1.1.51. According to some implementations, the configuration file associated with the spine node 102A includes an entry to relay DHCP discover messages to the DHCP/TFTP server 108 (e.g., IP DHCP relay 50.50.50.10). Similarly, as shown in FIG. 2A, the leaf node 104A has its core facing interfaces (e.g., fabric ports) configured as IP unnumbered loopback0 (lo0) with IP proxy-ARP, where the IP address of its loopback$0_{104A}$ is 1.1.1.1. According to some implementations, the global DHCP configuration file includes an entry that associates the DHCP relay source as the loopback0 (lo0) interface (e.g., IP DHCP relay source-interface loopback0).

According to some implementations, when the leaf node 104C is powered on, the POAP process is triggered due to the lack of a startup configuration. As shown in FIG. 2A, the leaf node 104C initiates the DHCP process by broadcasting (202) a DHCP discover message (e.g., on all of its interfaces).

Figure 2B:
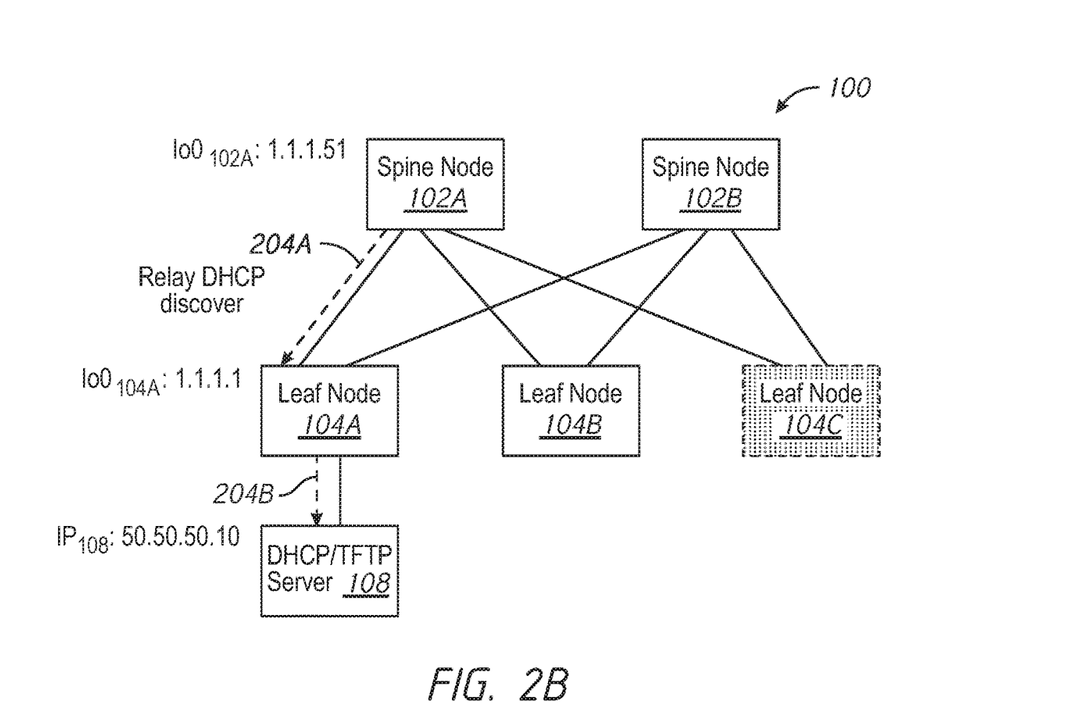

As shown in FIG. 2B, the spine node 102A receives the DHCP discover message at a respective interface, and relays (204A) the DHCP discover message to the leaf node 104A. In turn, the leaf node 104A routes (204B) the DHCP discover message to the DHCP/TFTP server 108 (e.g., routes or forwards a unicast packet). Upon receiving the DHCP discover message, the DHCP/TFTP server 108 inspects its DHCP configuration file (e.g., dhcpd.conf) for the scope in order to build a DHCP offer message that includes an offered IP address (e.g., temporary IP address 1.1.1.100), a subnet mask, a default gateway IP address, a lease length, an IP address for a file server that hosts a POAP script and/or a SW (software) image, and/or the like. For example, in a scenario where a new spine node connected to the leaf node 104A (not shown) is coming up, the leaf node 104A receives a DHCP discover message from the new spine node and relays the DHCP discover message to the DHCP/TFTP server 108.

Figure 2C:
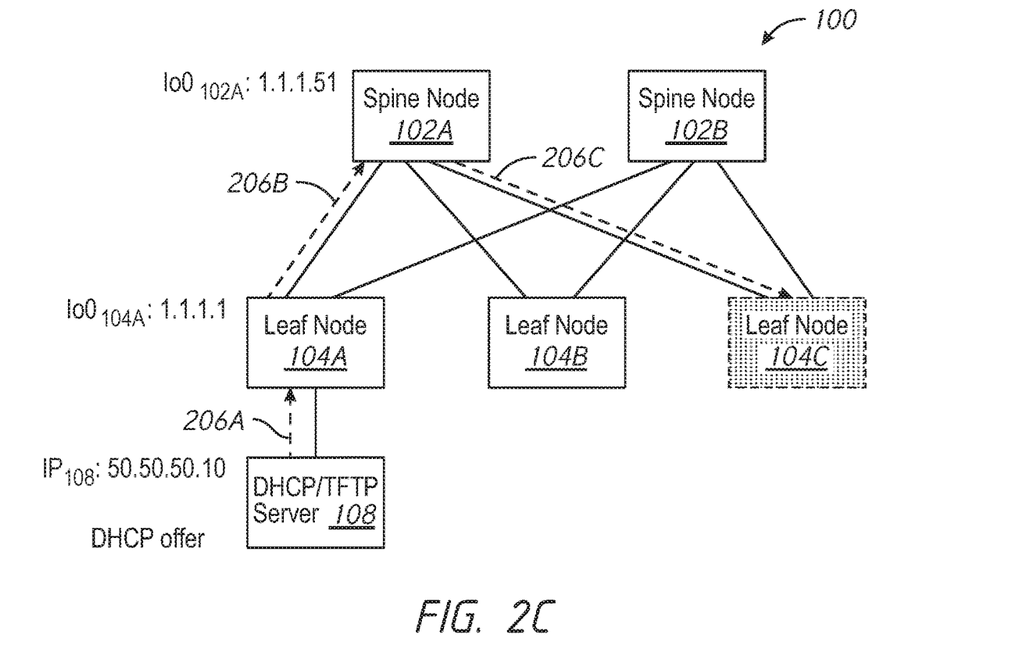

As shown in FIG. 2C, the DHCP/TFTP server 108 sends (206A) a DHCP offer message to the leaf node 104A. In turn, the leaf node 104A routes (206B) the DHCP offer message to the spine node 102A (e.g., routes or forwards a unicast packet). In turn, the spine node 102A relays (206C) the DHCP offer message to the leaf node 104C based on the respective interface that received the DHCP discover message. According to some embodiments, the DHCP messages (e.g., discover, offer, request, and acknowledgment) include source-interface information. As such, the spine node 102A parses the DHCP offer message in order to determine the source-interface to send out the packet on for replay 206C. As such, the spine node 102A is configured to handle the relaying of DHCP messages for multiple concurrent new leaf nodes coming up in the network. Upon receiving the DHCP offer message, the leaf node 104C continues the DHCP process by accepting the offered IP address and returning a DHCP request message to the DHCP/TFTP server 108.

Figure 2D:
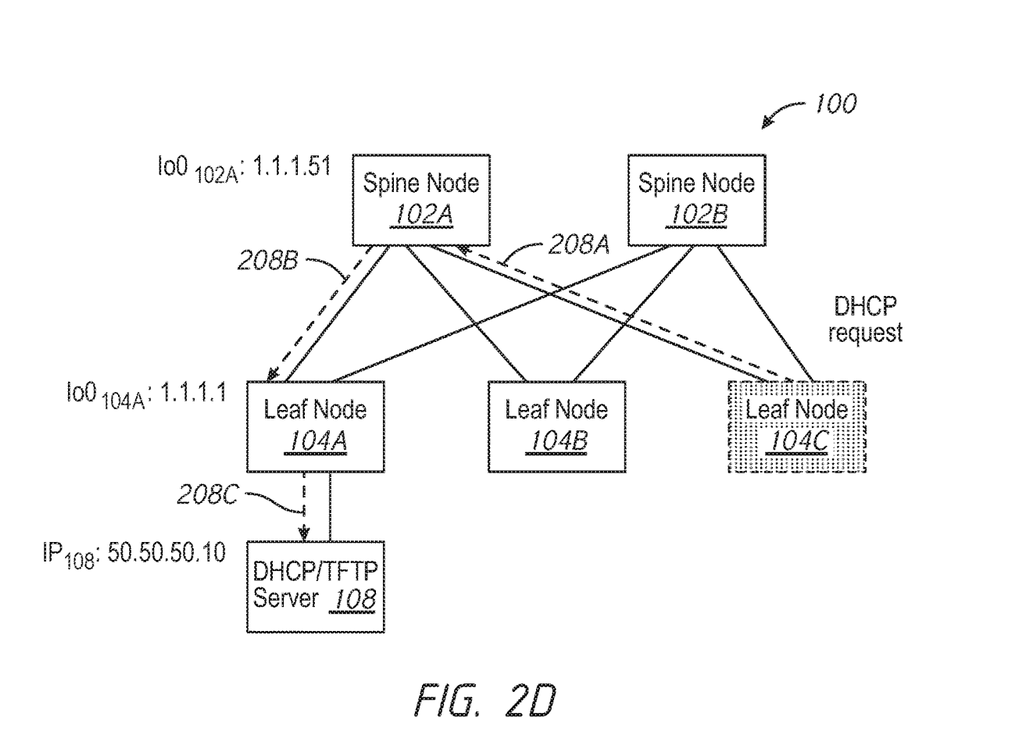

As shown in FIG. 2D, the leaf node 104C sends (208A) a DHCP request message to the spine node 102A. In turn, the spine node 102A relays (208B) the DHCP request message to the leaf node 104A. In turn, the leaf node 104A routes (208C) the DHCP request message to the DHCP/TFTP server 108. Upon receiving the DHCP request message, the DHCP/TFTP server 108 finalizes the DHCP process by returning a DHCP acknowledgment (ack) message to the leaf node 104C.

Figure 2E:
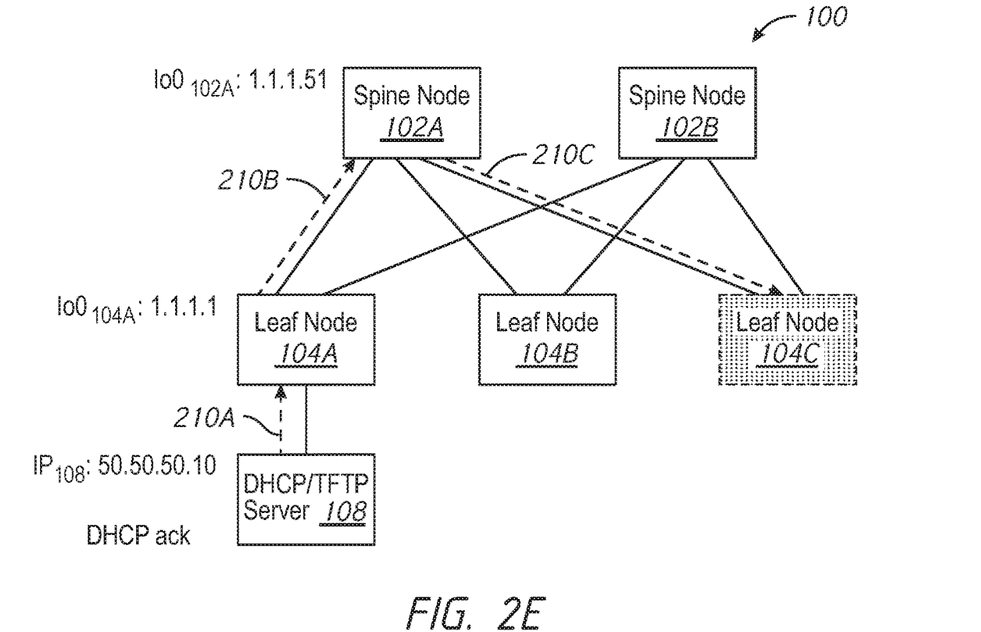

As shown in FIG. 2E, the DHCP/TFTP server 108 sends (210A) a DHCP acknowledgment message to the leaf node 104A. In turn, the leaf node 104A routes (210B) the DHCP acknowledgment message to the spine node 102A. In turn, the spine node 102A relays (210C) the DHCP acknowledgment message to the leaf node 104C based on the respective interface that received the DHCP discover/request message. Upon receiving the DHCP acknowledgment message, the leaf node 104C sets its IP address as the temporary IP address$_{104C}$ 1.1.1.100 and initiates an ARP (address resolution protocol) process to determine address information (e.g., a MAC (media access control) address) associated with the file server (e.g., the DHCP/TFTP server 108) in order to establish a communication channel with the file server to download the POAP script and/or the SW image.

Figure 2F:
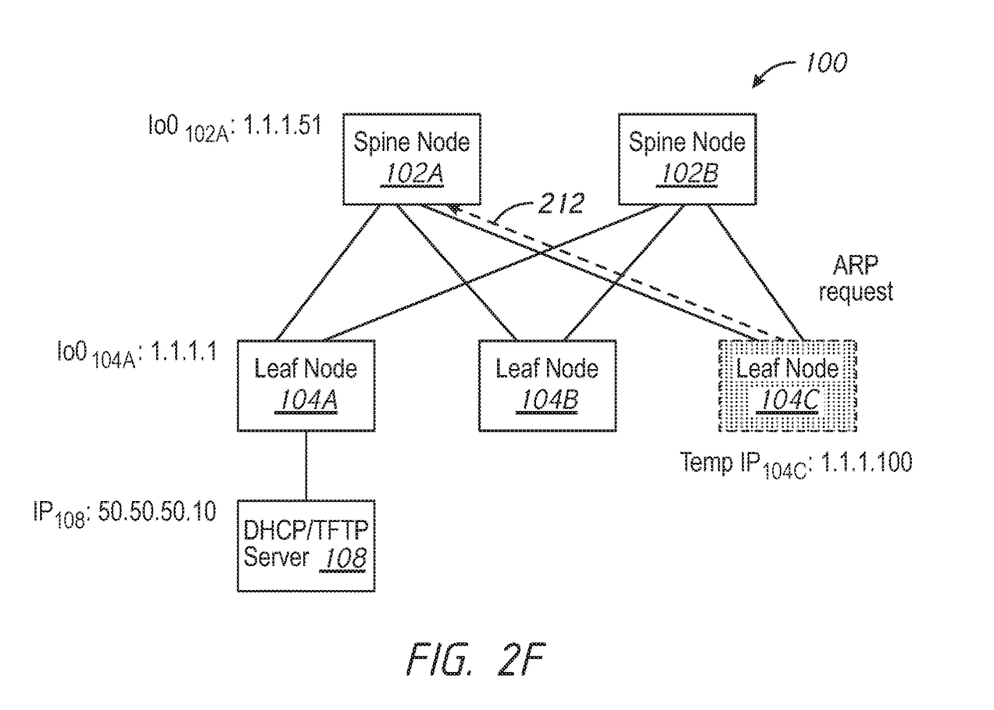

As shown in FIG. 2F, the leaf node 104C initiates the ARP process by sending (212) an ARP request message to the spine node 102A. Upon receiving the ARP request message, the spine node 102A learns of the temporary IP address$_{104C}$ 1.1.1.100 for the leaf node 104C. For example, the spine node 102A adds the temporary IP address$_{104C}$ for the leaf node 104C to its routing and/or ARP tables.

Figure 2G:
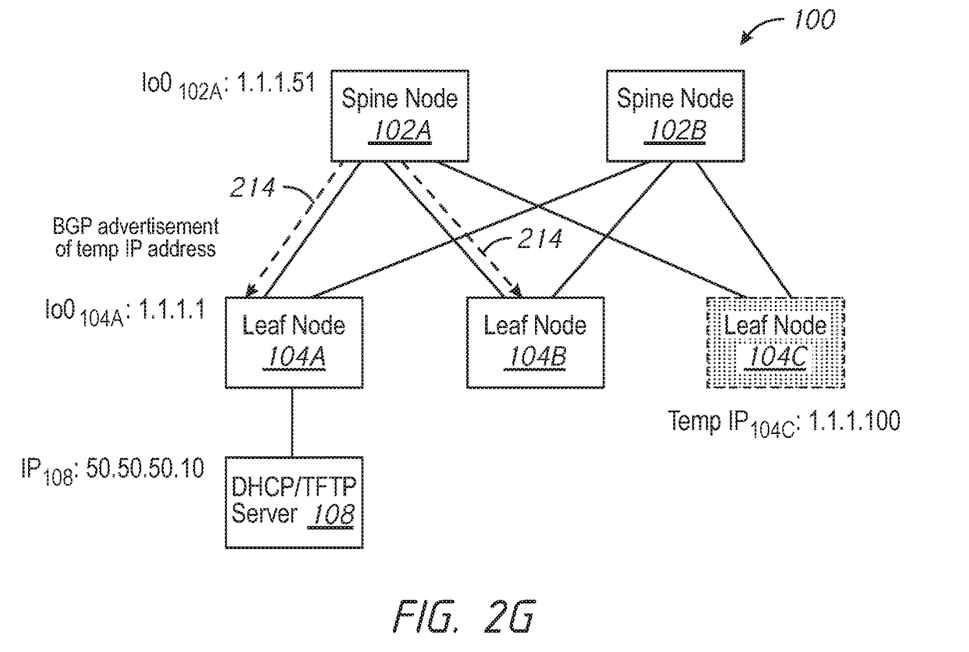

As shown in FIG. 2G, the spine node 102A advertises (e.g., broadcasts) (214) the temporary IP address$_{104C}$ 1.1.1.100 for the leaf node 104C to leaf nodes 104A and 104B via the BGP. For example, the leaf nodes 104A and 104B add the temporary IP address$_{104C}$ for the leaf node 104C to their routing and/or ARP tables. As such, a reverse path from the DHCP/TFTP server 108 to the leaf node 104C is established.

Figure 2H:
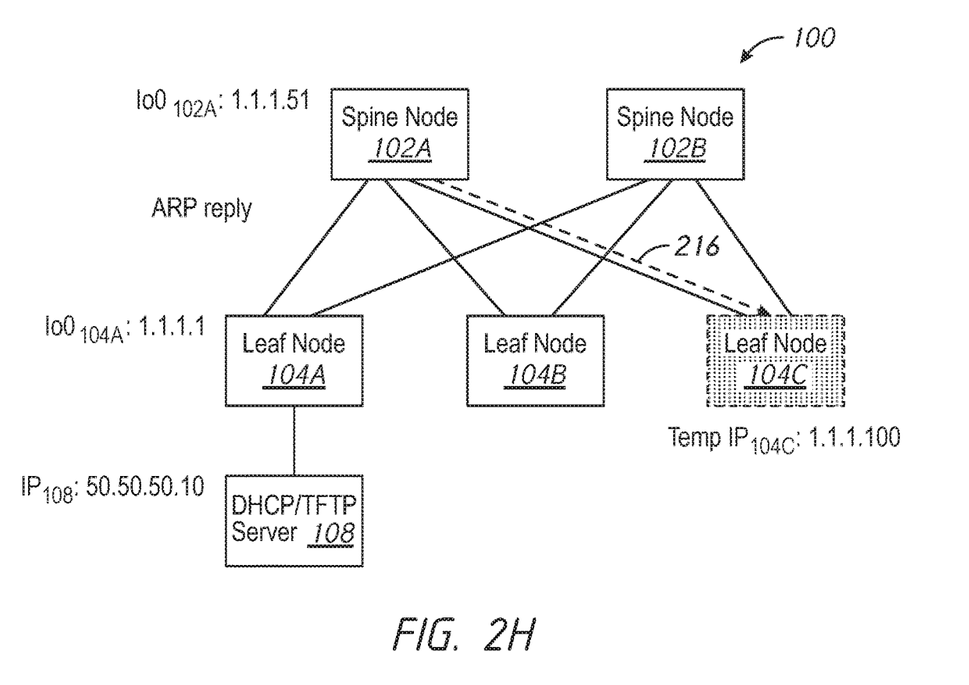

As shown in FIG. 2H, the spine node 102A sends (216) an ARP reply message to the leaf node 104C that includes the address information (e.g., the MAC address) associated with the file server (e.g., the DHCP/TFTP server 108). According to some embodiments, the steps 214 and 216 are preformed sequentially with step 214 or 216 being performed first. In some embodiments, the steps 214 and 216 are performed in parallel.

Figure 2I:
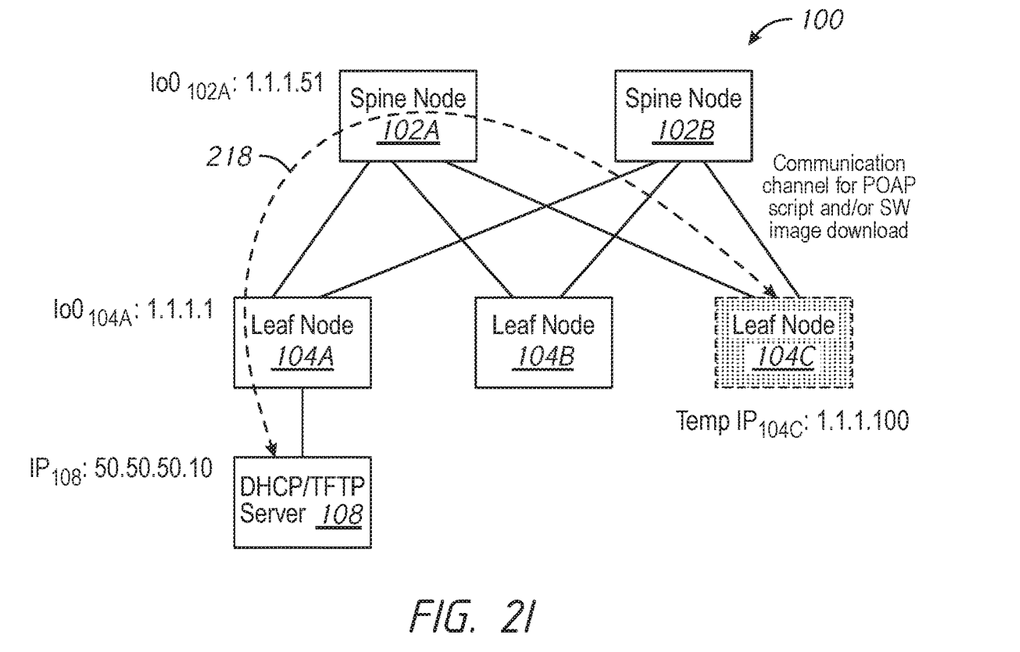

As shown in FIG. 2I, the leaf node 104C initiates (218) a first communication channel (e.g., via TFTP, FTP, SFTP, SCP, HTTP, or the like) with the DHCP/TFTP server 108 in order to download the POAP script and/or a configuration file. According to some implementations, after downloading the POAP script from the DHCP/TFTP server 108, the leaf node 104C executes the POAP script. For example, the POAP script includes a IP address and/or MAC address associated with a file server from which to download a software (SW) image and/or a configuration file. According to some implementations, the DHCP/TFTP server 108 provides DHCP functionality and also hosts the POAP script and/or the SW image. As such, the leaf node 104C initiates a second communication channel (e.g., via TFTP, FTP, SFTP, SCP, HTTP, or the like) with the DHCP/TFTP server 108 in order to download the SW image. In some implementations, the DHCP functionality, the POAP script, and the SW image are provided by different nodes/servers.

Figure 2J:
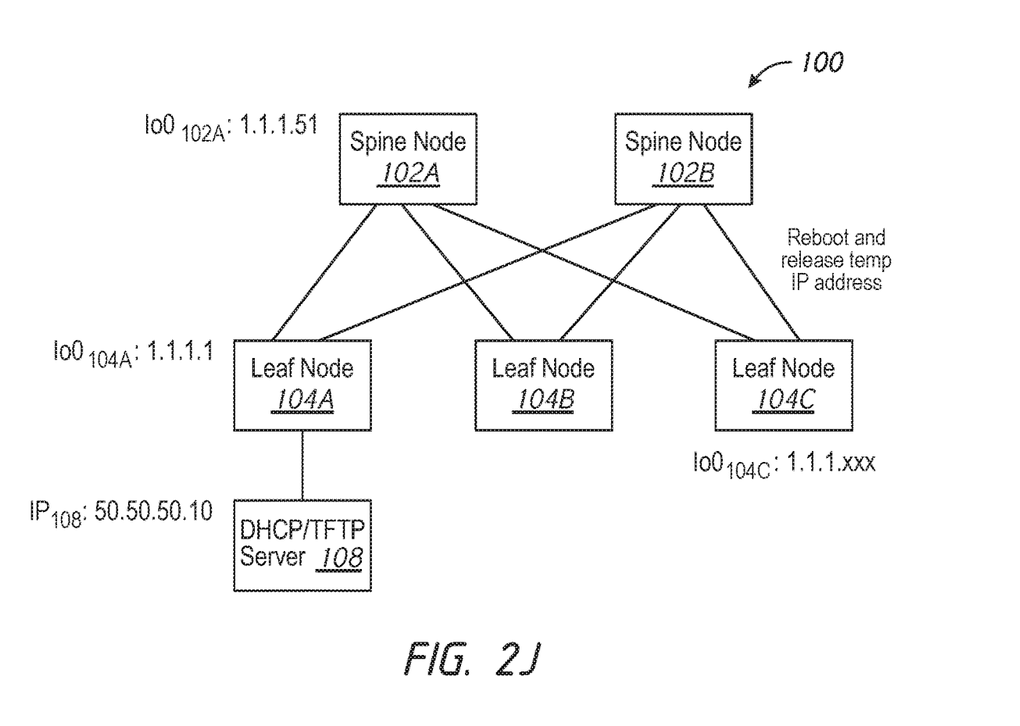

As shown in FIG. 2J, after downloading the SW image and/or the configuration file, the leaf node 104C reboots, releases the temporary IP address, and configures its core interfaces (e.g., fabric ports) as IP unnumbered loopback0 (lo0) and IP proxy-ARP, where the IP address of its loopback0$_{104C}$ is 1.1.1.xxx.

As will be appreciated by one of ordinary skill in the art, although FIGS. 2A-2J illustrate a POAP process whereby a new leaf node is configured through at least one existing spine node and at least one existing leaf node, in other various implementations, a new spine node may be similarly configured through at least one existing spine node and one or more existing leaf nodes. As will be appreciated by one of ordinary skill in the art, although FIGS. 2A-2J illustrate a POAP process whereby a single new leaf node is configured through at least one existing spine node and at least one existing leaf node, in other various implementations, multiple new leaf nodes may be concurrently configured. In this case, the existing spine nodes keep track of the incoming interfaces by which DHCP discover messages are received in order to relay DHCP offer messages to the correct new leaf node.

Figure 3:
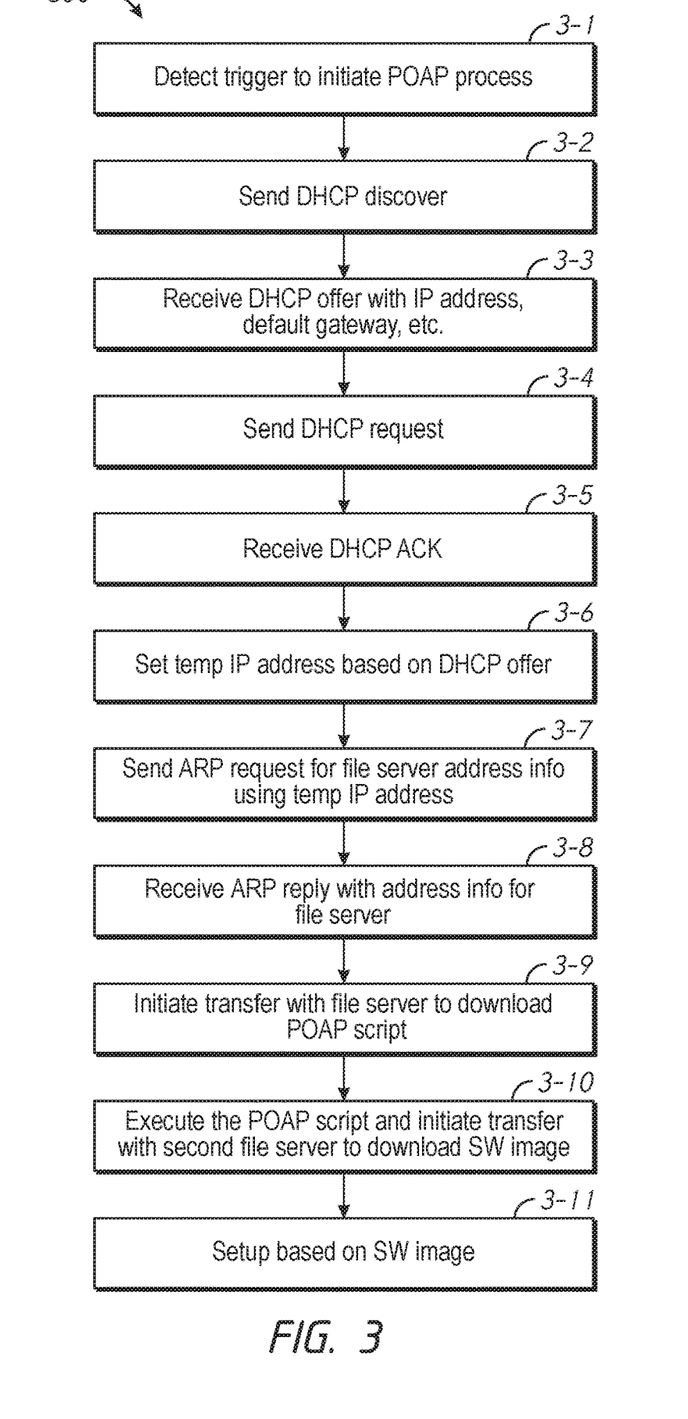
FIG. 3 is a flowchart representation of a method of performing a POAP process in accordance with some implementations.

FIG. 3 is a flowchart representation of a method 300 of performing a POAP process in accordance with some implementations. In various implementations, the method 300 is performed by a node within the network environment 100 (e.g., the leaf node 104C in FIG. 1 and FIGS. 2A-2J). In some implementations, the method 300 is performed by processing logic, including hardware, firmware, software, or a combination thereof. In some implementations, the method 300 is performed by a processor executing code stored in a non-transitory computer-readable medium (e.g., a memory).

To that end, as represented by block 3-1, the method 300 includes detecting a trigger to initiate a POAP process. In some implementations, the new leaf node triggers the POAP process upon powering-on and detecting the lack of a startup configuration. In some implementations, the new leaf node triggers the POAP process upon detecting the lack of a startup configuration.

As represented by block 3-2, the method 300 includes sending a DHCP discover message. For example, with reference to FIG. 2A, the leaf node 104C broadcasts a DHCP discover message (e.g., on all of its interfaces).

As represented by block 3-3, the method 300 includes receiving a DHCP offer message. For example, with reference to FIG. 2C, the leaf node 104C receives the DHCP offer message from the DHCP/TFTP server 108 that includes an offered IP address (e.g., the temporary IP address 1.1.1.100), a subnet mask, a default gateway IP address, a lease length, an IP address for a file server (e.g., a file server that communicates via TFTP, FTP, SFTP, SCP, HTTP, or the like) associated with a POAP script and/or SW image, and/or the like.

As represented by block 3-4, the method 300 includes sending a DHCP request message. For example, with reference to FIG. 2D, in response to receiving the DHCP offer message, the leaf node 104C accepts the offered IP address and sends a DHCP request message to the DHCP/TFTP server 108 (e.g., broadcasts the DHCP offer message on all of its interfaces).

As represented by block 3-5, the method 300 includes receiving a DHCP acknowledgment (ACK) message. For example, with reference to FIG. 2E, the leaf node 104C receives the DHCP acknowledgement message from the DHCP/TFTP server 108.

As represented by block 3-6, the method 300 includes setting the temporary (temp) IP address based on the DHCP offer message. In response to receiving the DHCP acknowledgment message, the leaf node 104C sets it IP address as the temporary IP address$_{104C}$ 1.1.1.100.

As represented by block 3-7, the method 300 includes sending an ARP request message for address information (e.g., the MAC address) associated with the file server using the temporary IP address. For example, with reference to FIG. 2F, in response to receiving the DHCP acknowledgment message, the leaf node 104C initiates the ARP process to determine address information associated with the file server (e.g., the DHCP/TFTP server 108) by sending an ARP request message to the spine node 102A. For example, leaf node 104C initiates the ARP process in order to establish a communication channel with the file server (e.g., the DHCP/TFTP server 108) to download the POAP script.

As represented by block 3-8, the method 300 includes receiving an ARP reply message with address information for the file server (e.g., the DHCP/TFTP server 108). For example, with reference to FIG. 2H, the leaf node 104C receives an ARP reply message that includes the address information (e.g., the MAC address) associated with the file server (e.g., the DHCP/TFTP server 108).

As represented by block 3-9, the method 300 includes initiating a transfer with the file server to download a POAP script. For example, with reference to FIG. 2I, the leaf node 104C establishes a first communication channel (e.g., via TFTP, FTP, SFTP, SCP, HTTP, or the like) with the file server (e.g., the DHCP/TFTP server 108) in order to download the POAP script and/or a configuration file.

As represented by block 3-10, the method 300 includes executing the POAP script and initiating a transfer with a second file server to download a software (SW) image and/or a configuration file. According to some implementations, after downloading the POAP script from the file server, the leaf node executes the POAP script. For example, the POAP script includes an IP address and/or MAC address associated with a second file server (e.g., the DHCP/TFTP server 108 or a different file server) from which to download a software (SW) image and/or a configuration file. As such, the leaf node establishes a second communication channel (e.g., via TFTP, FTP, SFTP, SCP, HTTP, or the like) with the second file server (e.g., the DHCP/TFTP server 108 or a different file server) in order to download the SW image and/or the configuration file.

As represented by block 3-11, the method 300 includes setting up based on the software image. For example, with reference to FIG. 2J, the leaf node 104C reboots, releases the temporary IP address, and configures its core facing interfaces (e.g., fabric ports) as IP unnumbered loopback0 (lo0) with IP proxy-ARP, where the IP address of its loopback0$_{104C}$ is 1.1.1.xxx.

Figure 4:
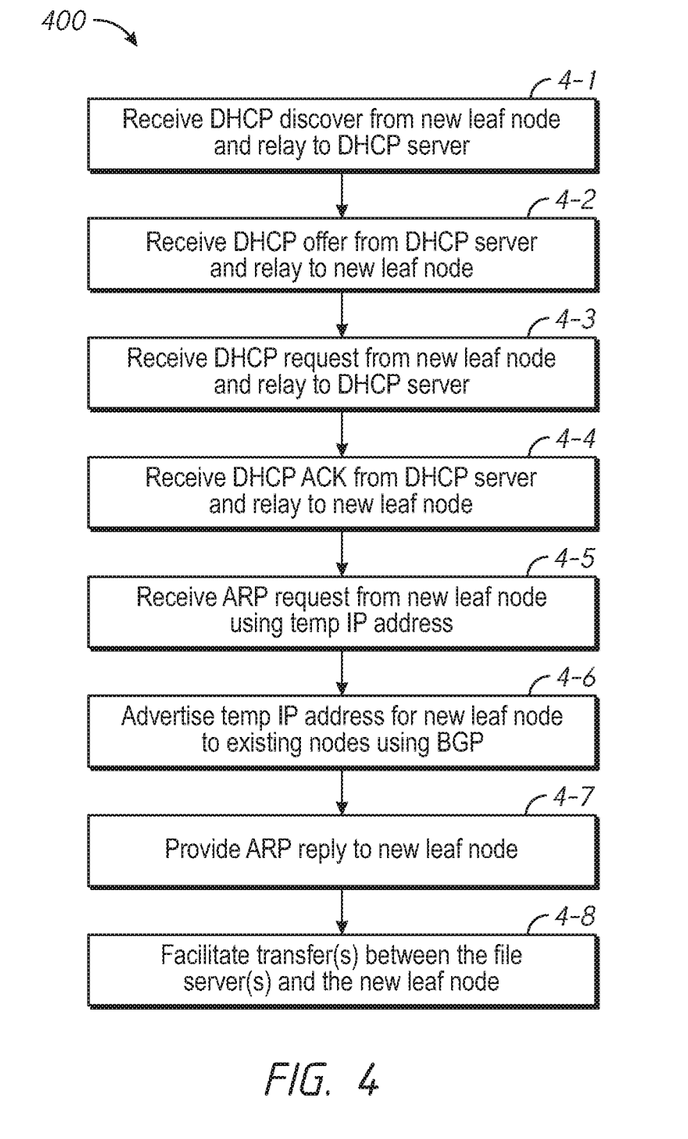
FIG. 4 is a flowchart representation of a method of facilitating a POAP process in accordance with some implementations.

FIG. 4 is a flowchart representation of a method 400 of facilitating a POAP process in accordance with some implementations. In various implementations, the method 400 is performed by a node within the network environment 100 (e.g., the spine node 102A in FIG. 1 and FIGS. 2A-2J). In some implementations, the method 400 is performed by processing logic, including hardware, firmware, software, or a combination thereof. In some implementations, the method 400 is performed by a processor executing code stored in a non-transitory computer-readable medium (e.g., a memory).

To that end, as represented by block 4-1, the method 400 includes receiving a DHCP discover message from a new leaf node, and relaying the DHCP discover message to the DHCP server. For example, with reference to FIGS. 2A-2B, the spine node 102A receives the DHCP discover message from the new leaf nodes 104C and relays the DHCP discover message to the DHCP/TFTP server 108. According to some implementations, the global DHCP configuration file includes an entry that associates the DHCP relay source as the loopback0 (lo0) interface (e.g., IP DHCP relay source-interface loopback0). According to some implementations, the configuration file associated with the spine node 102A includes an entry to relay DHCP discover messages to the DHCP/TFTP server 108 (e.g., IP DHCP relay 50.50.50.10).

As represented by block 4-2, the method 400 includes receiving a DHCP offer message from the DHCP server, and relaying the DHCP offer message to the new leaf node. For example, with reference to FIG. 2C, the spine node 102A receives the DHCP offer message from the DHCP/TFTP server 108 and relays the DHCP offer message to the new leaf nodes 104C based on the interface that received the DHCP discover message.

As represented by block 4-3, the method 400 includes receiving a DHCP request message from the new leaf node, and relaying the DHCP request message to the DHCP server. For example, with reference to FIG. 2D, the spine node 102A receives the DHCP request message from the new leaf nodes 104C and relays the DHCP request message to the DHCP/TFTP server 108.

As represented by block 4-4, the method 400 includes receiving a DHCP acknowledgment (ACK) message from the DHCP server, and relaying the DHCP ACK message to the new leaf node. For example, with reference to FIG. 2E, the spine node 102A receives the DHCP acknowledgement message from the DHCP/TFTP server 108 and relays the DHCP acknowledgement message to the new leaf nodes 104C based on the interface that received the DHCP discover/request message.

As represented by block 4-5, the method 400 includes receiving the ARP request message for address information (e.g., the MAC address) associated with a file server from the new leaf node using the temporary IP address. According to some implementations, the ARP request message seeks the MAC address for the file sever so that the new leaf node may initiate a transfer with the file server for the POAP script and/or the SW image hosted by the file server. For example, with reference to FIG. 2F, the spine node 102A receives the ARP request message from the new leaf node 104C. Upon receiving the ARP request message, the spine node 102A learns of the temporary IP address$_{104C}$ 1.1.1.100 for the leaf node 104C. For example, the spine node 102A adds the temporary IP address for the leaf node 104C to its routing and/or ARP tables.

As represented by block 4-6, the method 400 includes advertising (e.g., broadcasting) the temporary IP address associated with the new leaf node to existing nodes using the BGP. For example, with reference to FIG. 2G, the spine node 102A advertises the temporary IP address$_{104C}$ 1.1.1.100 for the leaf node 104C to leaf nodes 104A and 104B via the BGP. For example, the leaf nodes 104A and 104B add the temporary IP address$_{104C}$ for the leaf node 104C to their routing and/or ARP tables. As such, a reverse path from the DHCP/TFTP server 108 to the leaf node 104C is established.

As represented by block 4-7, the method 400 includes providing the ARP reply message to the new leaf node. For example, with reference to FIG. 2H, the spine node 102A provides an ARP reply message to the leaf node 104C that includes the address information (e.g., the MAC address) associated with the file server (e.g., the DHCP/TFTP server 108).

As represented by block 4-8, the method 400 includes facilitating one or more transfers between one or more servers and the new leaf node. For example, with reference to FIG. 2I, a first communication channel is established between the DHCP/TFTP server 108 and the new leaf node 104C for the new leaf node 104C to download the POAP script. According to some implementations, a second communication channel is established between the DHCP/TFTP server 108 and the new leaf node 104C for the new leaf node 104C to the SW image. In some implementations, the new leaf node 104C establishes the second communication channel with a different file server to download the SW image.

Figure 5:
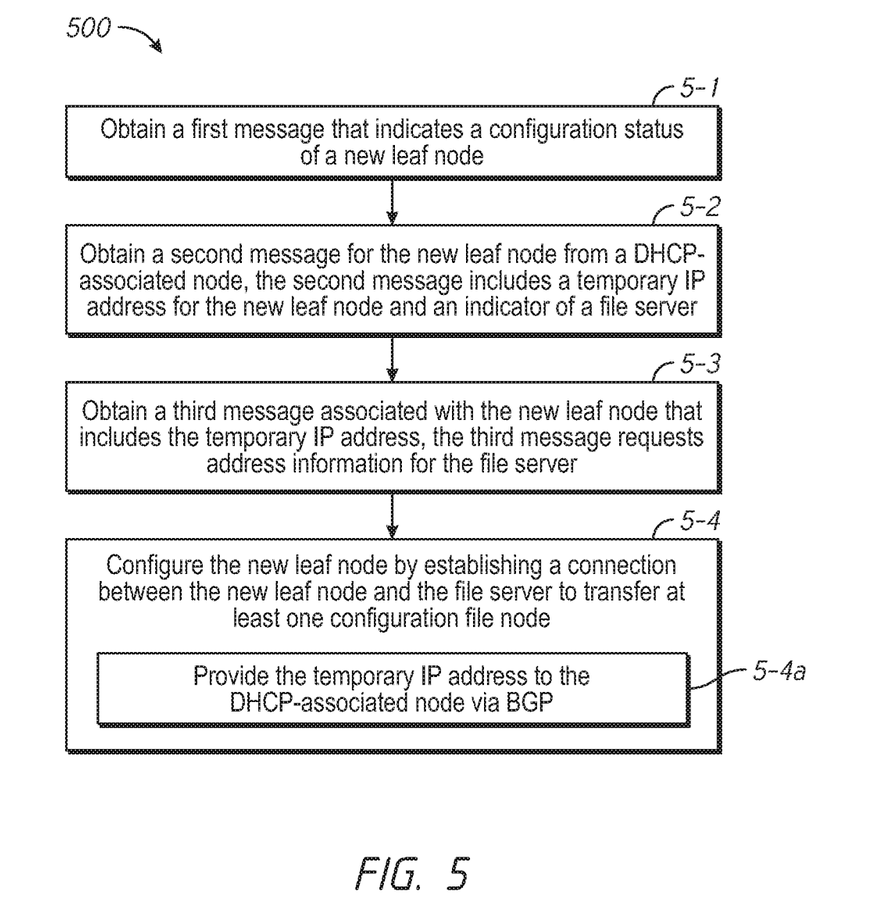
FIG. 5 is a flowchart representation of a method of facilitating a POAP process in accordance with some implementations.

FIG. 5 is a flowchart representation of a method 500 of facilitating a POAP process in accordance with some implementations. In various implementations, the method 500 is performed by a node within the network environment 100 (e.g., the spine node 102A in FIG. 1 and FIGS. 2A-2J). In some implementations, the method 400 is performed by processing logic, including hardware, firmware, software, or a combination thereof. In some implementations, the method 500 is performed by a processor executing code stored in a non-transitory computer-readable medium (e.g., a memory).

According to some implementations, the method 500 is performed at a first node with one or more processors, non-transitory memory, and a plurality of interfaces configured as Internet Protocol (IP) unnumbered interfaces sharing a single IP address and to communicate with a dynamic host configuration protocol (DHCP)-associated second node (e.g., the second node). For example, the first node is a spine node, and the second node is a leaf node. In some implementations, at least one spine node and at least the one leaf node are already configured/initialized in the VXLAN/EVPN topology. In some implementations, the core facing interfaces (e.g., fabric ports) of the leaf and spine nodes are configured as IP unnumbered interfaces, where all of said interfaces share a single IP address. In some implementations, the DHCP-associated second node provides a DHCP server. In some implementations, the DHCP-associated second node is coupled to a DHCP server. In some implementations, the second node provides at least one of a DHCP server or the file server.

To that end, as represented by block 5-1, the method 500 includes obtaining a first message that indicates a configuration status of a new leaf node (e.g., a third node). In some implementations, the first message is obtained directly from the third node or through an intermediary entity such as a setup agent/helper. For example, the first message is a DHCP discover message that is broadcast by the third node. For example, the DHCP discover message indicates that the third node lacks configuration information. In some implementations, the configuration status indicates the second node that the third node lacks configuration information. In some implementations, the first, second, and third nodes corresponds to switches.

As represented by block 5-2, the method 500 includes obtaining a second message for the new leaf node from a DHCP-associated node, the second message includes a temporary IP address for the new leaf node and an indicator of a file server. For example, the second message is a DHCP offer message. In some implementations, the first node relays the first message to the DHCP-associated second node, and receives the second message in response to the first message. For example, the indicator of the file server corresponds to an IP address or a uniform resource locator (URL) of the file server.

In some implementations, obtaining the second message includes: relaying the first message to the DHCP-associated second node; receiving the second message from the DHCP-associated second node in response to the first message; and relaying the second message to the third node based on the respective interface of the plurality of interfaces at which the first message was received in block 5-1. In some implementations, the configuration file for the spine node has a DHCP relay entry with the IP address of the DHCP server. For example, the second message is a DHCP offer message. In some implementations, the spine node maintains a DHCP traffic table that associates port numbers with the media access control (MAC) addresses associated with DHCP traffic in order to relay DHCP response traffic and to support multiple new leaf nodes coming-up concurrently.

As represented by block 5-3, the method 500 includes obtaining a third message associated with the new leaf node that includes the temporary IP address, the third message requests address information for the file server. In some implementations, the third message is obtained directly from the third node or through an intermediary entity such as a setup agent/helper. For example, the third message is an address resolution protocol (ARP) request. For example, the new leaf node is seeking the MAC address for the file server that stores the POAP script and/or the SW image. In some implementations, the first node adds the temporary IP address used by the third node to at least one of a routing table or an ARP table.

In some implementations, the third node provides a fourth message to the third node that includes the address information associated with the file server in response to obtaining the third message. For example, the fourth message is an ARP reply message.

As represented by block 5-4, the method 500 includes configuring the new leaf node by establishing a connection between the new leaf node and the file server to transfer at least one configuration file node. For example, in response to receiving the third message, the first node facilitates the transfer of the POAP script, configuration file(s), and/or SW image to the new leaf node via HTTP, FTP, TFTP, SFTP, SCP, or the like in order to configure the new leaf node.

As represented by block 5-4a, configuring the new leaf node includes providing the temporary IP address to the DHCP-associated node (e.g., at least the second node) via a border gateway protocol (BGP). In some implementations, the providing corresponds to a broadcast transmission of the temporary IP address used by the third node to the second node among other nodes. In some implementations, the providing corresponds to storing the temporary IP address used by the third node at a predefined location accessible to the second node among other nodes. In some implementations, the loopback interfaces of the first and second nodes are used for the BGP.

As will be appreciated by one of ordinary skill in the art, although the method 500 corresponds to a POAP process whereby a new leaf node is configured through at least one existing spine node and at least one existing leaf node, in other various implementations, a new spine node may be similarly configured through at least one existing spine node and one or more existing leaf nodes. As will be appreciated by one of ordinary skill in the art, although the method 500 corresponds to a POAP process whereby a single new leaf node is configured through at least one existing spine node and at least one existing leaf node, in other various implementations, multiple new leaf nodes may be concurrently configured.

Figure 6:
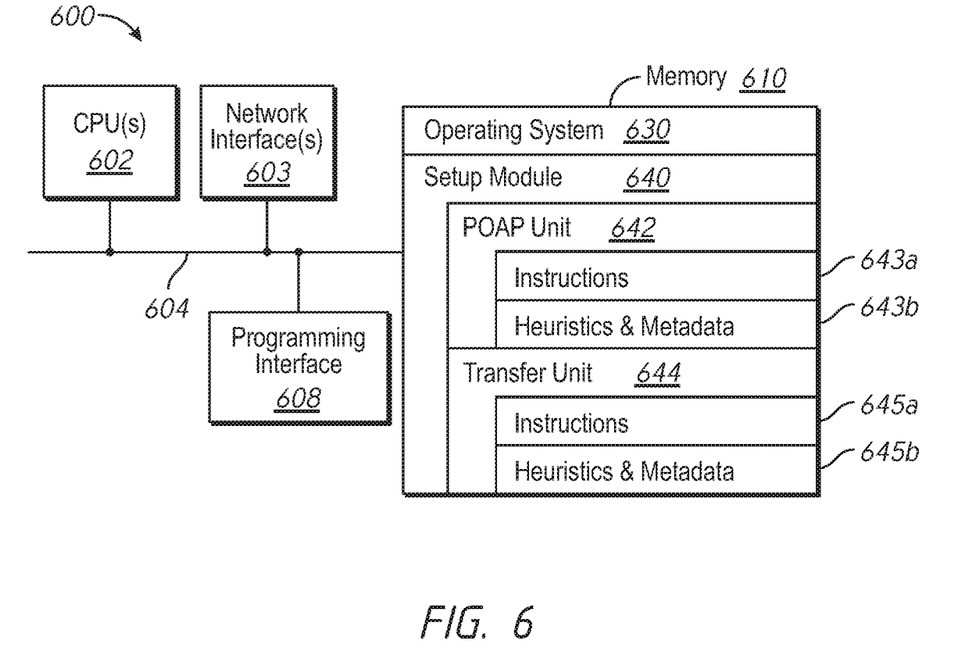
FIG. 6 is a block diagram of an example device in accordance with some implementations.

FIG. 6 is a block diagram of an example of a device 600 in accordance with some implementations. For example, in some implementations, the device 600 is similar to and adapted from the leaf node 104C in FIG. 1 and FIGS. 2A-2J. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units (CPUs) 602, one or more network interfaces 603, a memory 610, a programming (I/O) interface 608, and one or more communication buses 604 for interconnecting these and various other components.

In some implementations, the one or more communication buses 604 include circuitry that interconnects and controls communications between system components. The memory 610 includes high-speed random access memory, such as DRAM, SRAM, DDR RAM, or other random access solid state memory devices. In some implementations, the memory 610 includes non-volatile memory, such as one or more magnetic disk storage devices, optical disk storage devices, flash memory devices, or other non-volatile solid state storage devices. The memory 610 optionally includes one or more storage devices remotely located from the one or more CPUs 602. The memory 610 comprises a non-transitory computer readable storage medium. In some implementations, the memory 610 or the non-transitory computer readable storage medium of the memory 610 stores the following programs, modules and data structures, or a subset thereof including an optional operating system 620 and a setup module 640.

The operating system 620 includes procedures for handling various basic system services and for performing hardware dependent tasks.

In some implementations, the setup module 640 is configured to setup/initialize a new node in the network environment 100. According to some implementations, the setup module 640 includes a POAP unit 642 and a transfer unit 644.

In some implementations, the POAP unit 642 is configured to detect a trigger to initiate the POAP process and, in turn, initiate a DHCP process. To that end, in various implementations, the POAP unit 642 includes instructions and/or logic 643a, and heuristics and metadata 643b.

In some implementations, the transfer unit 644 is configured to establish one or more communication channels (e.g., via TFTP, FTP, SFTP, SCP, HTTP, or the like) with one or more file servers to download a POAP script, configuration file, and/or SW image. To that end, in various implementations, the transfer unit 644 includes instructions and/or logic 645a, and heuristics and metadata 645b.

Although the POAP unit 642 and the transfer unit 644 are illustrated as residing on a single device (e.g., the device 600), it should be understood that in other implementations, any combination of the POAP unit 642 and the transfer unit 644 reside on separate devices, memory modules, virtual machines, or the like.

Moreover, FIG. 6 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 7:
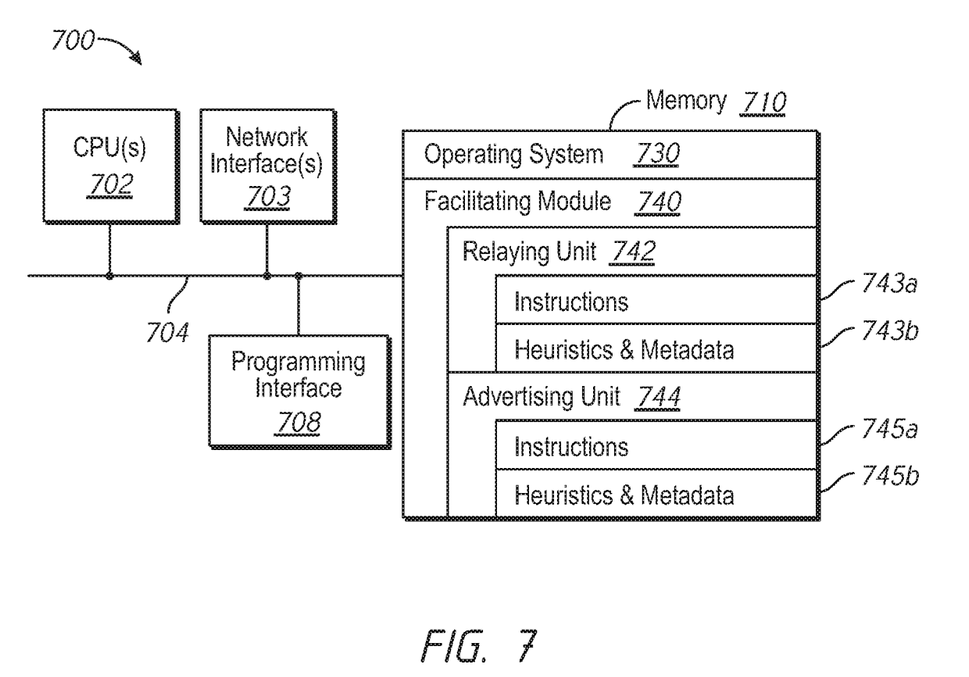
FIG. 7 is a block diagram of an example device in accordance with some implementations.

FIG. 7 is a block diagram of an example of a device 700 in accordance with some implementations. For example, in some implementations, the device 700 is similar to and adapted from the spine node 102A in FIG. 1 and FIGS. 2A-2J. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units (CPUs) 702, one or more network interfaces 703, a memory 710, a programming (I/O) interface 708, and one or more communication buses 704 for interconnecting these and various other components.

In some implementations, the one or more communication buses 704 include circuitry that interconnects and controls communications between system components. The memory 710 includes high-speed random access memory, such as DRAM, SRAM, DDR RAM, or other random access solid state memory devices. In some implementations, the memory 710 includes non-volatile memory, such as one or more magnetic disk storage devices, optical disk storage devices, flash memory devices, or other non-volatile solid state storage devices. The memory 710 optionally includes one or more storage devices remotely located from the one or more CPUs 702. The memory 710 comprises a non-transitory computer readable storage medium. In some implementations, the memory 710 or the non-transitory computer readable storage medium of the memory 710 stores the following programs, modules and data structures, or a subset thereof including an optional operating system 720 and a facilitating module 740.

The operating system 720 includes procedures for handling various basic system services and for performing hardware dependent tasks.

In some implementations, the facilitating module is configured to facilitate the POAP process. According to some implementations, the facilitating module 740 includes a relaying unit 742 and an advertising unit 744.

In some implementations, the relaying unit 742 is configured to relay DHCP messages (e.g., DHCP discover, offer, request, and acknowledgment messages) between a node associated with an incoming port and a DHCP server. To that end, in various implementations, the relaying unit 742 includes instructions and/or logic 743*a*, and heuristics and metadata 743*b*.

In some implementations, the advertising unit 744 is configured to advertise a temporary IP address of a node to other nodes (e.g., via the BGP). To that end, in various implementations, the advertising unit includes instructions and/or logic 745*a*, and heuristics and metadata 745*b*.

Although the relaying unit 742 and the advertising unit 744 are illustrated as residing on a single device (e.g., the device 700), it should be understood that in other implementations, any combination of the relaying unit 742 and the advertising unit 744 reside on separate devices, memory modules, virtual machines, or the like.

Moreover, FIG. 7 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   obtaining a first message that indicates a configuration status of a third node at a respective interface of a plurality of interfaces of a first node, wherein the third node is an unconfigured node;
   obtaining, by the first node, a second message for the third node from a DHCP-associated second node, wherein the second message comprises a temporary IP address for the third node and an indicator of a file server;
   obtaining, by the first node, a third message from the third node, wherein the third message comprises the temporary IP address, and wherein the third message requests address information for the file server; and
   configuring, by the first node, the third node, wherein configuring the third node comprises establishing a connection between the third node and the file server to transfer at least one configuration file, wherein configuring the third node includes providing, by the first node, the temporary IP address to the DHCP-associated second via a border gateway protocol (BGP), wherein the plurality of interfaces are core facing network ports and configured as Internet Protocol (IP) unnumbered interfaces, wherein the IP unnumbered interfaces point to a loop back interface, and wherein core facing network ports of each of the first node, the DHCP-associated second node, and the third node participate in an interior gateway protocol and share an unique IP address.

2. The method of claim 1, wherein obtaining the second message comprises:
   relaying the first message to the DHCP-associated second node;
   receiving the second message from the DHCP-associated second node in response to the first message; and relaying the second message to the third node based on the respective interface of the plurality of interfaces.

3. The method of claim 2, wherein the first message corresponds to a DHCP discover message, and wherein relaying the first message to the DHCP-associated second node comprises relaying the first message to the DHCP-associated second node based on a relay configuration setting associated with DHCP messages.

4. The method of claim 1, wherein obtaining the first message comprises receiving the first message from the third node.

5. The method of claim 1, wherein obtaining the first message comprises receiving the first message from an intermediary node on behalf of the third node.

6. The method of claim 1, wherein the first message corresponds to a DHCP discover request message, and wherein the second message corresponds to a DHCP offer message.

7. The method of claim 1, further comprising providing a fourth message to the third node that includes the address information associated with the file server in response to obtaining the third message.

8. The method of claim 7, wherein the third message corresponds to an ARP request message, and wherein the fourth message corresponds to an ARP reply message.

9. The method of claim 1, further comprising adding the temporary IP address to at least one of a routing table or an ARP table.

10. The method of claim 1, wherein the first and DHCP-associated second nodes are connected in a virtual extensible local area network/Ethernet virtual private network (VX-LAN/EVPN) topology.

11. The method of claim 1, wherein each of the first node, the DHCP-associated second node, and the third node corresponds to switches.

12. The method of claim 1, wherein loopback interfaces of the first node and the DHCP-associated second node are used for the BGP.

13. The method of claim 1, wherein the at least one configuration file corresponds to at least one of a power-on auto-provisioning (POAP) script or a software image.

14. The method of claim 1, wherein the DHCP-associated second node provides at least one of a DHCP server or the file server.

15. A first node comprising:
a plurality of interfaces configured as Internet Protocol (IP) unnumbered interfaces sharing a single IP address and to communicate with a dynamic host configuration protocol (DHCP)-associated second node; and
one or more processors configured to:
obtain a first message that indicates a configuration status of a third node at a respective interface of the plurality of interfaces, wherein the third node is an unconfigured node;
obtain a second message for the third node from the DHCP-associated second node, wherein the second message comprises a temporary IP address for the third node and an indicator of a file server;
obtain a third message from the third node, wherein the third message comprises the temporary IP address, and wherein the third message requests address information for the file server; and
configure the third node by establishing a connection between the third node and the file server to transfer at least one configuration file, wherein configuring the third node comprises providing the temporary IP address to the DHCP-associated second node via a border gateway protocol (BGP), wherein the plurality of interfaces are core facing network ports and are configured as Internet Protocol (IP) unnumbered interfaces, wherein the IP unnumbered interfaces point to a loop back interface, and wherein core facing network ports of each of the first node, the DHCP-associated second node, and the third node participate in an interior gateway protocol and share an unique IP address.

16. The first node of claim 15, wherein the one or more processors are further configured to:
relay the first message to the DHCP-associated second node;
receive the second message from the DHCP-associated second node in response to the first message; and
relay the second message to the third node based on the respective interface of the plurality of interfaces.

17. The first node of claim 15, wherein the first message corresponds to a DHCP discover request message, and wherein the second message corresponds to a DHCP offer message.

18. A non-transitory memory comprising instructions, which, when executed at a first node, cause the first node to:
obtain a first message that indicates a configuration status of a third node at a respective interface of a plurality of interfaces of the first node, wherein the third node is an unconfigured node;
obtain a second message for the third node from a DHCP-associated second node, wherein the second message comprises a temporary IP address for the third node and an indicator of a file server;
obtain a third message from the third node, wherein the third message comprises the temporary IP address, and wherein the third message requests address information for the file server; and
configure the third node by establishing a connection between the third node and the file server to transfer at least one configuration file, wherein configuring the third node comprises providing the temporary IP address to the DHCP-associated second node via a border gateway protocol (BGP), wherein the plurality of interfaces of the first node are core facing network ports and configured as Internet Protocol (IP) unnumbered interfaces, wherein the IP unnumbered interfaces point to a loop back interface, and wherein core facing network ports of each of the first node, the DHCP-associated second node, and the third node participate in an interior gateway protocol and share an unique IP address.

19. The non-transitory memory of claim 18, wherein the instructions further cause the first node to:
relay the first message to the DHCP-associated second node;
receive the second message from the DHCP-associated second node in response to the first message; and
relay the second message to the third node based on the respective interface of the plurality of interfaces.

20. The non-transitory memory of claim 18, wherein the first message corresponds to a DHCP discover request message, and wherein the second message corresponds to a DHCP offer message.

* * * * *